United States Patent [19]

Long et al.

[11] 4,064,004
[45] Dec. 20, 1977

[54] ASSEMBLY MECHANISM FOR NUCLEAR FUEL BUNDLES

[75] Inventors: John W. Long; Barney S. Flora; Kenneth L. Ford, all of Richland, Wash.

[73] Assignee: Exxon Nuclear Company, Inc., Bellevue, Wash.

[21] Appl. No.: 660,664

[22] Filed: Feb. 23, 1976

[51] Int. Cl.² .............................................. G21C 3/30
[52] U.S. Cl. ......................................... 176/78; 176/76
[58] Field of Search .......................... 176/76, 78, 87; 403/322, 320

[56] References Cited

U.S. PATENT DOCUMENTS

| | | | |
|---|---|---|---|
| 3,382,153 | 5/1968 | Bigge | 176/78 |
| 3,431,170 | 3/1969 | Lass | 176/79 |
| 3,608,933 | 9/1971 | Lee | 403/320 |
| 3,741,868 | 6/1973 | Qurnell | 176/79 |
| 3,769,158 | 10/1973 | Winders | 176/78 |
| 3,864,211 | 2/1975 | King | 176/78 |
| 3,953,287 | 4/1976 | Long | 176/78 |
| 3,971,575 | 7/1976 | Lesham | 403/320 |

*Primary Examiner*—Samuel W. Engle
*Assistant Examiner*—Donald P. Walsh
*Attorney, Agent, or Firm*—R. D. Hantman

[57] ABSTRACT

In a nuclear power reactor fuel bundle having tie rods fastened to a lower tie plate and passing through openings in the upper tie plate, the assembled bundle is secured by locking lugs fixed to rotatable locking sleeves which engage the upper tie plate. Pressure exerted by helical springs mounted around each of the tie rods urge retaining lugs fixed to a retaining sleeve associated with respective tie rods into a position with respect to the locking sleeve to prevent accidental disengagement of the upper plate from the locking lugs. The bundle may be disassembled by depressing the retaining sleeves and rotating the locking lugs to the disengaged position, and then removing the upper tie plate.

12 Claims, 9 Drawing Figures

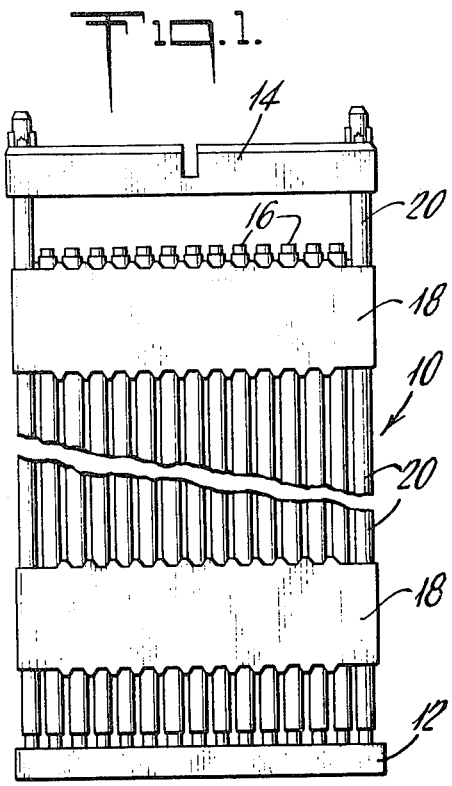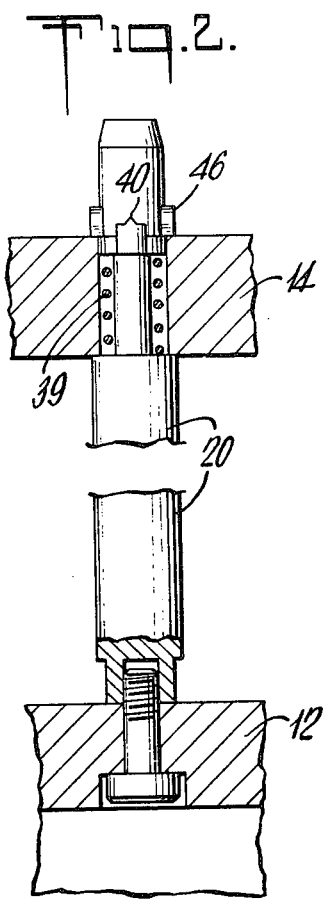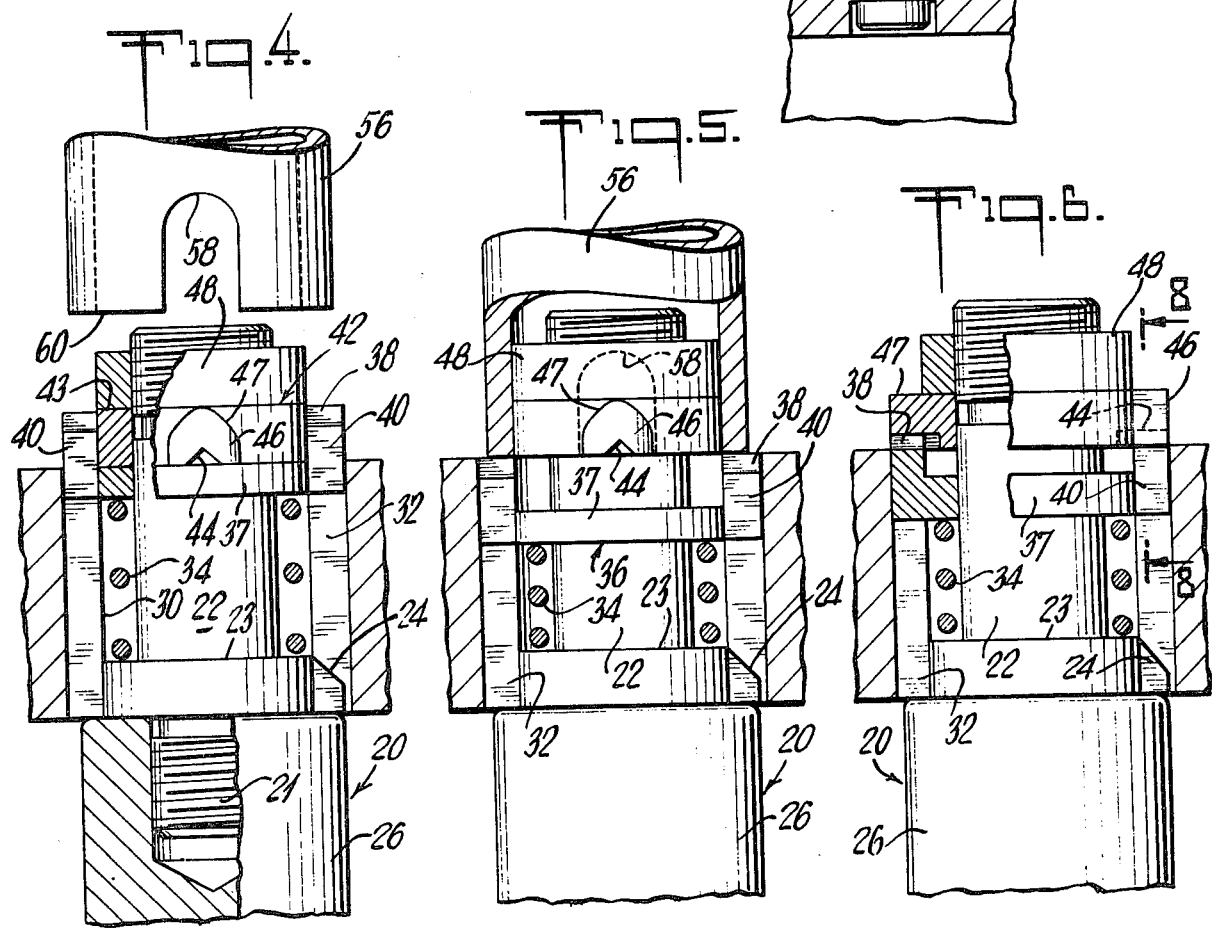

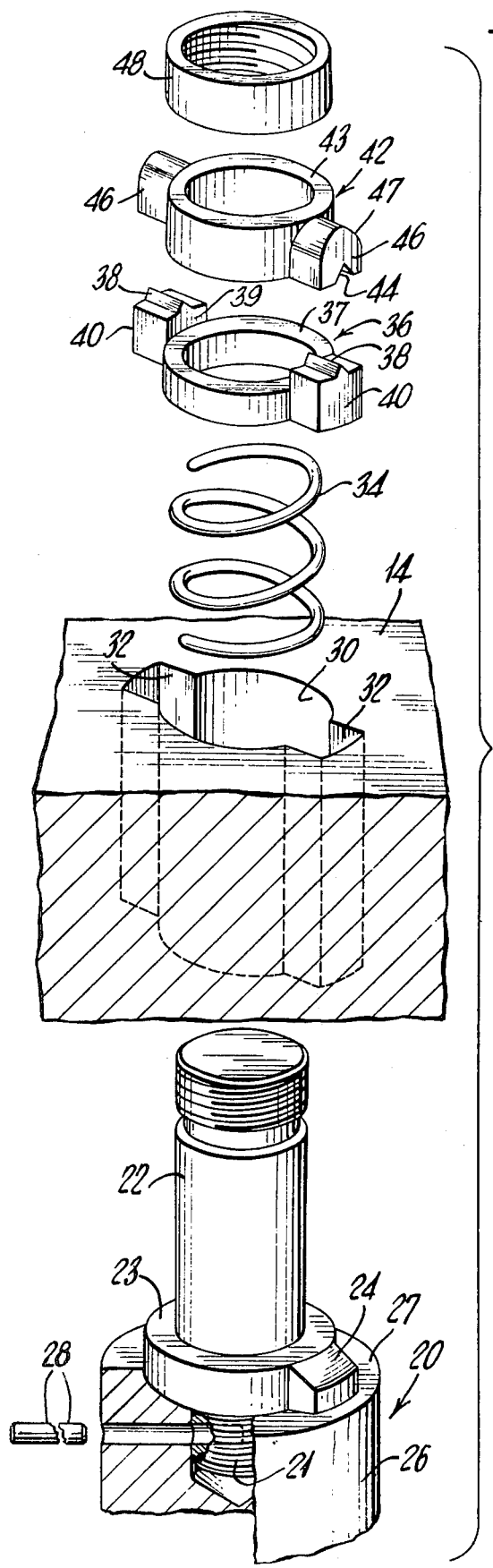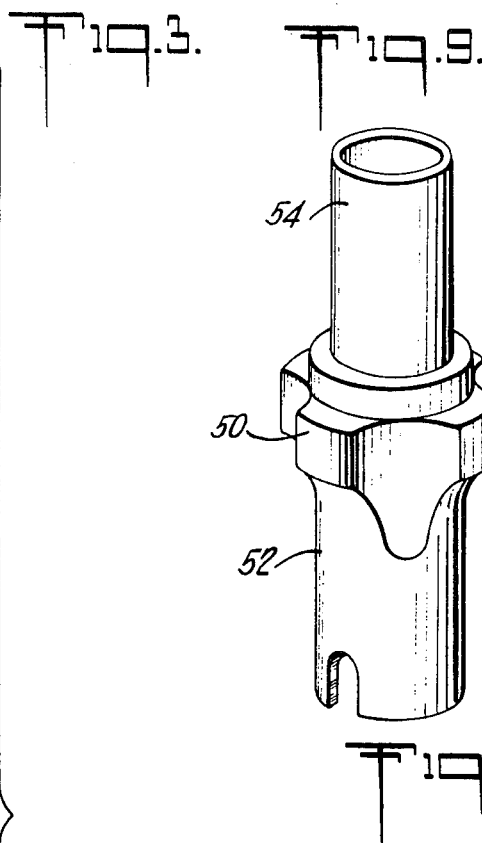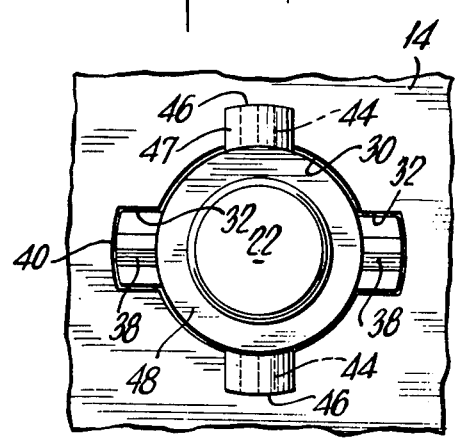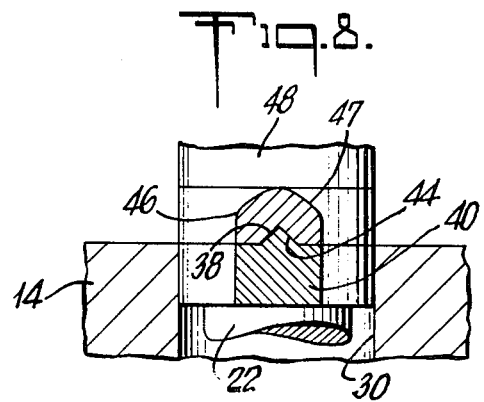

ASSEMBLY MECHANISM FOR NUCLEAR FUEL BUNDLES

BACKGROUND OF THE INVENTION

The present invention relates to nuclear power reactor fuel bundles and, in particular, to an improved apparatus for the assembly and disassembly of such bundles.

In a typical nuclear power reactor, nuclear fission occurs within so-called "fuel rods" which are assembled in a parallel array into bundles, a multiplicity of which consitute the fuel core of a reactor. Heat from the nuclear fission reaction is taken up by a fluid (usually water) flowing along the outer surface of the rods. As the reactor operates, the fuel is gradually consumed, and it is necessary at periodic intervals to replace the fuel. However, only a minor fraction of the fuel rods are replaced at any one time, in order to avoid large variations in reactor operation. In the event of premature bundle failure or fuel inspection, it is necessary to remove the bundles and to disassemble them for repairs, replacement, or inspection of selected rods. Thus, the bundles may be adapted for easy disassembly by remote means, since they become highly raidoactive during the operation of the reactor.

A number of arrangements have been disclosed in the prior art for assembling nuclear power reactor fuel bundles. See for example, U.S. Pat. No. 3,431,170 and copending application Ser. No. 386,201, filed Aug. 6, 1973, now U.S. Pat. No. 3,953,287, the latter being assigned to the same assignee as the present application. Many of the prior art arrangements, however, require the removal of relatively small parts which is difficult to do by remote disassembly techniques. Any system for locking fuel rods in a fuel bundle should be as simple as possible, not only to reduce the cost of the locking system employed, but also to simplify the need for special tools and complicated procedures for the subsequent disassembly and reassembly of the bundles under remote control conditions. The possibility of losing parts during remote disassembly makes it highly desirable to provide a locking system which, preferably, need not be disassembled at any time after the initial assembly.

The structure of Ser. No. 386,201 avoids this difficulty, but it, as well as that of the patent, is only applicable to fuel assemblies in which the upper tie plate is loaded by springs which push it upwardly. There is need for a design which is readily operable remotely, which avoids separable parts and which is applicable to fuel assemblies in which the upper tie plate is rigidly mounted on the tie rods which hold it in place.

The present invention overcomes the deficiencies and disadvantages of the prior art and accomplishes the foregoing objectives by providing a novel and simple, inexpensive means of assembling a nuclear reactor fuel bundle.

SUMMARY OF THE INVENTION

The present invention relates to a nuclear power reactor fuel bundle of the type wherein a plurality of fuel rods are mounted in parallel array between two tie plates which secure the fuel rods in place and are maintained in assembled position by means of a plurality of tie rods secured to both of the end plates, including improved apparatus for attaching the tie rods to, for example, the upper tie plate by the use of locking lugs fixed to rotatable sleeves which engage the upper tie plate.

Each of the tie rods passes through an opening in one of the tie plates and extends beyond it. The openings are bores with guide slots. Onto the end of each of said tie rods is mounted, in order starting from the upper end, the principal parts which constitute the basic features of a preferred embodiment of the present invention comprising: a collar or threaded nut fixed to the tie rod; a sleeve, with lugs for securing the tie plate to the tie rod, fixed to the tie rod by the collar or nut so that it may be rotated about the tie rod; a retaining sleeve which includes projections for restraining the locking sleeve in a position so that the upper tie plate is either secured to or unsecured from the tie rod; a helical spring mounted on the tie rod adjacent to the retaining sleeve for biasing the retaining sleeve into a restraining position; and a shoulder, which may have a positioning lug for engaging a guide slot provided in the opening in the end plate for preventing the tie rod from rotating about its axis, fixed to the tie rod directly or integral with the tie rod itself or fixed to a sleeve about the tie rod.

In order to remove the upper tie plate during the disassembly process, it is only necessary to depress each of the retaining sleeves aganist the pressure of the springs surrounding the tie rods and then to rotate each locking lug from its securing position to its unsecuring position, whereupon it is possible to remove the tie plate without disassembling the retaining assembly.

Having in mind the above and other objects and advantages that will be apparent from an understanding of this disclosure, the present invention comprises the construction and arrangements as illustrated in the presently preferred embodiments of this invention, which are hereinafter set forth in such detail as to enable those skilled in the art to readily understand the function, operation, construction and advantages of it when read in conjunction with the accompanying drawings.

BRIEF DESCRIPTION OF THE DRAWINGS

FIG. 1 is an elevational view of a fuel bundle assembled according to the present invention.

FIG. 2 is a sectional view in elevation of FIG. 1 showing an assembled tie rod in accordance with the present invention.

FIG. 3 is an exploded perspective view of an end of a tie rod and its associated retaining assembly for retaining the rod in place in the bundle.

FIG. 4 is an elevated view in partial cross-section of the tie rod retaining assembly in its secured position, together with a portion of the disassembly tool.

FIG. 5 is the same view as FIG. 4, except that the disassembly tool has depressed the retaining sleeve in preparation for rotating the locking lug to the unsecured position.

FIG. 6 is a view similar to that of FIG. 5, except that the locking lug has been rotated to the unsecured position.

FIG. 7 is a top view of the retaining assembly shown in FIG. 4.

FIG. 8 shows a sectional view taken along 8—8 of FIG. 6.

FIG. 9 is an alternate embodiment of the tie rod and upper plate support.

DESCRIPTION OF THE PREFERRED EMBODIMENT

Throughout the views, same reference numerals refer to same parts.

In FIG. 1 there is shown an overall view of a portion of an assembled nuclear fuel bundle 10. In parallel array between a lower tie plate 12 and an upper tie plate 14 are fuel rods 16 containing fissionable fuel which is consumed during the reactor operation, creating heat which is transferred to water flowing between the rods 16. The fuel rods 16 are suspended between the tie plates 12 and 14, and may be restricted in their lateral movement by fuel rod spacers 18. The fuel bundle is held together by a plurality of tie rods 20 disposed throughout the bundle, which may be secured in various ways.

However, it is important to secure the tie rods 20 to the upper tie plate so that the bundle may be easily disassembled, since after the bundle has become radioactive by operation in a nuclear reactor it can no longer be handled manually.

As shown in FIG. 2, the lower end of the tie rod 20 is secured conventionally, e.g. a screw, into the lower tie plate 12 which normally need not be removed after the initial assembly. If fuel rods 16 are to be removed, the upper tie plate 14 is removed, and thus, the locking of the tie rod 20 to the upper tie plate 14 must be secure, but also must permit easy disassembly by remotely operated tools. This disassembly is done by remote operation and with the bundle underwater since the fuel bundle becomes radioactive after its exposure in the reactor. For further details of a typical nuclear reactor fuel bundle, to which this invention is applicable, reference can be made to U.S. Pat. No. 3,379,619. As shown by this patent, the tie rods may be tubular and serve as guide tubes for control rods. This invention is equally applicable to solid and tubular tie rods.

In FIG. 3, there is shown an embodiment including a tie rod 20 which comprises a solid rod member 26 having one end 21 of a stud 22 whose diameter is smaller than the maximum diameter of the rod 26, threaded into a bore proviced in the top end of the rod 26. A pin 28 is inserted radially into a laterally extending hole through both the rod 26 and the end 21 (or at least into locking contact therewith) of the stud threaded into the rod 26 for preventing the stud from becoming loose or disengaged from the rod. A rim 23 surrounds the stud 22 at the intersection of the stud 22 and the rod 26. Since the rod 26 has a maximum diameter which is larger than that of the rim 23 mounted around the stud 22, there is formed a shoulder 27 comprising the surface area at the stud end of the rod 26 which extends radially outward of the stud. This shoulder 27 provides a seat which serves to support the upper tie plate 14, as best shown in FIG. 4. The exposed portion of the stud 22 above the rim 23 serves as the axis about which the remainder of the retaining assembly is fixed. One or more positioning lugs 24 may be fixed at the periphery of the rim 23 and extend radially outward. Tie plate 14 is provided with bores 30 corresponding to the number of tie rods for the particular fuel assembly through which the stud 22 extends and which are provided with diametrically opposed guide slots 32 extending radially outward and passing through the tie plate to permit passage of the locking lugs 46 and the retaining lugs 40. The guide slots 32 mate with the optional positioning lugs 24 (see FIG. 4) which adds torsional rigidity to the upper tie plate to tie rod connection. The stud is centered within the bore 30 by the rim 23. The rim 23 has a slightly smaller diameter than the bore 30 and thus fits into the bore 30. With the tie rod extending through the bore 30, a helical spring 34 fits over the stud 22 and sits on the rim 23. Resting on the opposite end of the spring is a freely-mounted retaining sleeve 36 and above it is a locking sleeve 42, also freely-mounted on the stud 22, which are held in place against the spring by an adjusting collar or nut 48 which may be threaded or welded on the end of the stud 22. The locking sleeve 42 comprised an annular shaped body 43 and locking lugs 46 extending radially outward which are shaped so that the locking sleeve 42 slides readily through the bore 30 and guide slots 32. The body 43 of the locking sleeve has a diameter slightly smaller than that of the bore 30. At the bottom of each lug 46 is a downward facing substantially V- or U-shaped notch 44. The retaining sleeve 36 has essentially the same overall configuration as the locking sleeve, including an annular body 37 and lugs 40. However, the retaining lug 40 extends upwardly above the body 37 of the sleeve 36 and the inner radial surfaces 39 of these extensions of the lugs are spaced apart by a distance slightly greater than the outside diameter of the body portion 43 of locking sleeve 42. On the top surface of each retaining lug 40 is a substantially V- or U-shaped projection 38 shaped to fit in the corresponding notch 44 in the lower surface of each of the locking lugs 46.

FIG. 9 shows an alternate embodiment for the tie rod and upper tie plate support arrangement. Instead of the shoulder 27, the plate support comprises lugs 50 integrally formed on a separate sleeve member 52 which fits over a guide tube 54. The lugs 50 extend radially outward from the sleeve member 52 which is fixed to the guide tube 54. The guide tube extends through the sleeve 52 and serves as the axis for supporting the remainder of the assembly mechanism.

The initial assembly of the assembly mechanism is as follows. The shoulder 27 (FIG. 3) or alternately, the lugs 50 (FIG. 9) are axially positioned on the tie rods with proper angular orientation so that the positioning lugs 24 (FIG. 3) of the tie rods are aligned for mating engagement with the guide slots 32 of the upper tie plate 14. The latter is then placed with the positioning lugs engaged in the guide slots 32. The rim 23 fits into the bore 30 and centers the stud 22 within the bore. Spring 34 is inserted into the bore 30 around the stud 22 followed by the retaining sleeve 36 and locking sleeve 42. Adjusting nut 48 is then installed on the end of the stud. The sleeves 36 and 42 are positioned so that retaining lugs 40 are aligned with slots 32 while the body 43 of locking sleeve 42 rests on the body 37 of retaining sleeve 36 with locking lugs 46 at 90° relative to retaining lugs 40 so that this lug arrangement forms a cross when viewed from above (see FIG. 7). The adjusting nut 48 is then screwed down until locking lugs 46 are in close sliding contact with the top of plate 14. Nut 48 may then be welded in position. Alternately, a collar can be secured to a guide tube by flaring the end of the guide tube after positioning the collar to provide close sliding contact between the locking lugs 46 and the top of plate 14. The tie plate 14 is now secured in place. The retaining lugs 40 are disposed partially within slots 32 and partially above the tie plate 14, thus preventing the accidental turning of locking sleeve 42 to its unsecuring position. FIG. 4 best shows the assembly in the secured position.

To remove the upper tie plate 14, a tool 56 is employed. FIGS. 4, 5, and 6 show the tool applied to the assembly in the secured position. The tool includes a hollow cylinder having an annular end surface 60 interrupted by axial slots 58 corresponding to the positions of the locking lugs 46. The tool is inserted with annular surface 60 resting on projections 38 of retaining lugs 40 and slots 58 engaging (i.e. overlying) the locking lugs 46. By applying pressure to the tool whose surface 60 rests on projections 38, the retaining sleeve 36 is forced down against spring 34 (see FIG. 5). A handle (not shown) is used to rotate the tool about the axis of the tie rod so that the locking lugs 46, being engaged by the slots 58, are turned until projections 38 snap into notches 44. (See FIGS. 6 and 8.) Locking lugs 46 and guide slots 32 are now aligned and held in this position. The foregoing operation is repeated for each rod or tube and the upper tie plate then may be lifted off the assembly.

To replace the upper tie plate on the fuel assembly, lugs 46 and 40 (held in proper relation by the engagement of notches 44 and projections 38 for each tie rod) are aligned with positioning lugs 24. The plate may now be readily applied as all lugs are aligned to fit in corresponding guide slots 32. If optional positioning lugs 24 are not used, lugs 46 and 40 are rotated with tool 56 to be approximately in alignment with guide slots 32. The tapered surfaces 47 on the upper side of locking lugs 46 interfacing with guide slots 32 force the lugs 46 and 40 to the aligned position when tie plate 14 is applied. Using tool 56, locking sleeves 42 are turned about 90°. Camming action between notches 44 and projections 38 depresses spring 34 slightly, and permits the turning. When the tool is removed, retaining sleeve 36 is pushed up by spring 34 and the extensions of retaining lugs 40 protrude above slots 32 which, as before, prevent accidental turning of locking sleeve 42 to the unlocked position (see FIG. 4).

It will be appreciated from the foregoing that there has been disclosed a novel and improved assembly mechanism for nuclear fuel bundles. However, it should be understood that the construction and arrangements herein illustrated and described are intended to be representative of only preferred embodiments and that certain changes certain changes readily may be made therein without departing from the clear teachings and scope of the present invention. Accordingly, reference should be made to the following appended claims in determining the full scope of this invention.

What is claimed is:

1. A nuclear power reactor fuel bundle comprising:
   a. a lower tie plate;
   b. a plurality of tie rods each having an upper and a lower end, said lower end of each of said tie rods being fixed to said lower end plate;
   c. an upper tie plate having an opening including a radially outward guide slot extending through said upper tie plate;
   d. a plate support member at said upper end fixed to each of said tie rods for supporting said upper tie plate;
   e. a locking sleeve having a locking lug extending radially outward, said locking sleeve operably fixed to said upper end of each of said tie rods and of a shape to pass through said opening and guide slot in said upper tie plate, said locking sleeve rotatably movable between a securing and unsecuring position such that in said securing position said locking lug engages said upper tie plate and secures said upper tie plate to said tie rod;
   f. a retaining sleeve adjacent to said locking sleeve including an annular body and a retaining lug extending radially outward, said retaining sleeve movably attached to said tie rod; and
   g. a means for biasing said retaining sleeve in retaining engagement with said locking sleeve.

2. The nuclear power reactor fuel bundle of claim 1 wherein:
   a. said locking sleeve includes two locking lugs extending radially outward and diametrically opposed; and
   b. said retaining sleeve includes two retaining lugs extending radially outward and diametrically opposed.

3. The nuclear power reactor fuel bundle of claim 2 wherein said retaining lug is of a shape to pass through said guide slot.

4. The nuclear power reactor fuel bundle of claim 3 wherein said retaining lug extends beyond said annular body in a direction along the axis of said tie rod such that said retaining lug is partially within said guide slot when said locking sleeve is in said securing position.

5. The nuclear power reactor fuel bundle of claim 1 further comprising a rim around said tie rod adjacent to said plate support for centering said tie rod within said opening.

6. The nuclear power reactor fuel bundle of claim 3 wherein:
   a. said locking lug includes a notch extending radially outward; and
   b. said retaining lug includes projections of substantially the same shape as said notch extending radially outward for retaining said locking sleeve in said unsecuring position with said upper tie plate.

7. The nuclear power reactor fuel bundle of claim 6 further comprising a positioning lug fixed to said rim and of a shape that said positioning lug is disposed within said guide slot when said locking sleeve is in said securing position, thereby preventing rotation of said tie rod.

8. The nuclear power reactor fuel bundle of claim 1 further comprising an adjusting nut fixed to said upper end of said tie rod for restricting axial movement of said locking sleeve toward said upper end of said tie rod.

9. The nuclear power reactor fuel bundle of claim 1 wherein said plate support comprises a shoulder on said tie rod.

10. The nuclear power reactor fuel bundle of claim 1 wherein said plate support comprises:
    a. a sleeve mounted for restricted axial movement on said tie rod; and
    b. a lug fixed to said sleeve.

11. The nuclear power reactor fuel bundle of claim 1 wherein said locking lugs includes upper tapered surfaces.

12. A nuclear power reactor fuel bundle comprising:
    a. a lower tie plate;
    b. a plurality of tie rods each having an upper and a lower end, said lower end of each of said tie rods being fixed to said lower end plate.
    c. an upper tie plate having an opening including a radially outward guide slot extending through said upper tie plate;
    d. a plate support member at said upper end fixed to each of said tie rods for supporting said upper tie plate;

e. a locking sleeve having a locking lug extending radially outward, said locking sleeve operably fixed to said upper end of each of said tie rods and of a shape to pass through said opening and guide slot in said upper tie plate, said locking sleeve rotatably movable between a securing and unsecuring position such that in said securing position said locking lug engages said upper tie plate and secures said upper tie plate to said tie rod, said locking lug including a notch on the said adjacent to said upper tie plate.

f. a retaining sleeve adjacent to said locking sleeve including an annular body and a retaining lug extending radially outward, said retaining sleeve movably attached to said tie rod, said retaining lug including projections of substantially the same shape as said notch extending radially outward for retaining said locking sleeve in said unsecuring position with said upper tie plate.

g. a resilient member for biasing said retaining sleeve in retaining engagement with said locking sleeve;

h. a rim around said tie rod adjacent to said plate support for centering said tie rod within said opening;

i. a positioning lug fixed to said rim and of a shape such that said positioning lug is disposed within said guide slot when said locking sleeve is in said securing position, thereby preventing rotation of said tie rod.

j. an adjusting nut fixed to said upper end of said tie rod for restricting axial movement of said locking sleeve toward said upper end of said tie rod.

* * * * *